United States Patent
Sathyanarayana

(10) Patent No.: US 7,460,716 B2
(45) Date of Patent: Dec. 2, 2008

(54) SYSTEMS AND METHODS FOR PRODUCING A DYNAMIC CLASSIFIED IMAGE

(75) Inventor: Shashidhar Sathyanarayana, Union City, CA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 731 days.

(21) Appl. No.: 10/940,359

(22) Filed: Sep. 13, 2004

(65) Prior Publication Data
US 2006/0056703 A1 Mar. 16, 2006

(51) Int. Cl.
*G06K 9/62* (2006.01)

(52) U.S. Cl. .................... 382/224; 382/170; 706/20

(58) Field of Classification Search ........... 382/224, 382/159, 228, 157, 149, 227, 226, 160, 118, 382/225, 156, 165, 161, 155, 220, 170; 706/25, 706/20, 14; 704/E11.003, 231, 236; 700/47; 707/E17.09, 6; 430/137.2; 600/306, 473–475, 600/310; 378/141; 250/316.1, 338.1; 356/51, 356/71; 374/10, 121, 124; 348/77, 87, 161; 340/825.36, 825.14; 128/922; 377/25; 702/130–136
See application file for complete search history.

(56) References Cited

U.S. PATENT DOCUMENTS

| | | | |
|---|---|---|---|
| 4,858,124 A | 8/1989 | Lizzi et al. | |
| 4,982,339 A | 1/1991 | Insana et al. | |
| 5,363,850 A | 11/1994 | Soni et al. | |
| 5,417,215 A | 5/1995 | Evans et al. | |
| 5,520,185 A | 5/1996 | Soni et al. | |
| 5,745,601 A | 4/1998 | Lee et al. | |
| 5,995,651 A * | 11/1999 | Gelenbe et al. | 382/156 |
| 6,118,887 A * | 9/2000 | Cosatto et al. | 382/103 |
| 6,120,445 A | 9/2000 | Grunwald | |
| 6,200,268 B1 | 3/2001 | Vince et al. | |
| 6,466,687 B1 * | 10/2002 | Uppaluri et al. | 382/128 |
| 6,494,720 B1 | 12/2002 | Meyrowitsch | |
| 6,564,176 B2 | 5/2003 | Kadtke et al. | |
| 6,757,412 B1 * | 6/2004 | Parsons et al. | 382/128 |

(Continued)

FOREIGN PATENT DOCUMENTS

WO WO 01/82787 A2 11/2001

OTHER PUBLICATIONS

Isabelle Bloch: "Fusion d'informations en traitement du signal et des images", 2003, Lavoisier, Paris, XP002368351, pp. 53-55, 138-139, 178-184, and 212-214.

(Continued)

*Primary Examiner*—Sheela C Chawan
(74) *Attorney, Agent, or Firm*—Darby & Darby P.C.

(57) ABSTRACT

The systems and methods can apply a plurality of different classifiers to a given input image instead of a single classifier. The plurality of classifiers produce a plurality of classified images based on the input image, which are sequentially displayed to a human observer. The sequential display of the classified images produces a dynamic classified image, in which the classification of the input image varies with time depending on which one of the classified image is displayed at a given instant. The dynamic classified image provides dynamic stimuli that encourages the human visual system to excuse occasional classification errors from a minority of the classified images and to retain generally correct classifications from a majority of the classified images.

17 Claims, 3 Drawing Sheets

U.S. PATENT DOCUMENTS

| | | |
|---|---|---|
| 6,776,760 B2 | 8/2004 | Marmarelis |
| 7,272,586 B2 * | 9/2007 | Nauck et al. ............... 706/52 |
| 2003/0072496 A1 | 4/2003 | Woodell et al. |
| 2003/0143524 A1 * | 7/2003 | Lerner ...................... 435/5 |
| 2004/0143403 A1 * | 7/2004 | Brandon et al. ............ 702/19 |
| 2005/0207633 A1 * | 9/2005 | Arini et al. ............... 382/133 |

OTHER PUBLICATIONS

William K. Pratt: "Digital Image Processing", 2001, Wiley, New York, XP002368352, pp. 364-365.

S.Y. Kung et al: Biometric Authentication, Sep. 1, 2004, Prentice Hall, Uppersaddle River, NJ, USA, XP002368353, pp. 370-373.

Kuncheva L I., et al: "Decision Templates For Multiple Classifer Fusion: An Experimental Comparison", Pattern Recognition, Elsevier, Kidlington, GB, vol. 34, No. 2, Feb. 2001, pp. 299-314, XP004321265.

Alexandre L.A., et al: On Combining Classifiers Using Sum And Product Rules, Pattern Recognition Letters, North-Holland Publ. Amsterdam, NL, vol. 22, No. 12, Oct. 2001, pp. 1283-1289.

* cited by examiner

SYSTEMS AND METHODS FOR PRODUCING A DYNAMIC CLASSIFIED IMAGE

FIELD OF THE INVENTION

The field of the invention relates to image classification, and more particularly, to systems and methods for producing a dynamic classified image.

BACKGROUND

Classifiers are used in image processing to classify pixels or regions in an image into one of a number of predefined classes. For example, a classifier can be used to classify regions in an image of natural scenery into one of a number of classes such as leaves, grass, or sky. In the medical field, classifiers are used to classify regions in images of patients into different types of tissue, for example, abnormal or diseased tissue and normal tissue.

Many different types of classifiers have been developed including Bayesian classifiers, k-nearest neighbor classifiers, and neural network classifiers. Typically, a classifier is customized for a given classification problem by training the classifier to identify particular classes. This usually involves presenting the classifier with a set of example image regions that are representative of known classes. The classifier extracts features from the set of example image regions and learns to associate these features with the known classes based on association rules. Once the classifier has been trained to identify the classes, the classifier can be used to identify occurrences of these classes in new images.

In practice, classifiers misclassify image regions some of the time. Therefore, there is a need to improve classification accuracy.

SUMMARY

The systems and methods described herein improve classification accuracy by applying a plurality of different classifiers to a given input image instead of a single classifier. In one exemplary embodiment, the plurality of classifiers preferably produces a plurality of classified images based on the input image, which are sequentially displayed to a human observer. The sequential display of the classified image produces a dynamic classified image, in which the classification of the input image varies with time depending on which one of the classified image is displayed at a given instant. The dynamic classified image provides dynamic stimuli that encourage the human visual system to excuse occasional classification errors from a minority of the classified images and to retain generally correct classifications from a majority of the classified images.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. It is also intended that the invention is not limited to require the details of the example embodiments.

BRIEF DESCRIPTION OF THE FIGURES

The details of the invention may be gleaned in part by study of the accompanying figures, in which like reference numerals refer to like segments.

DETAILED DESCRIPTION

Figure 1:
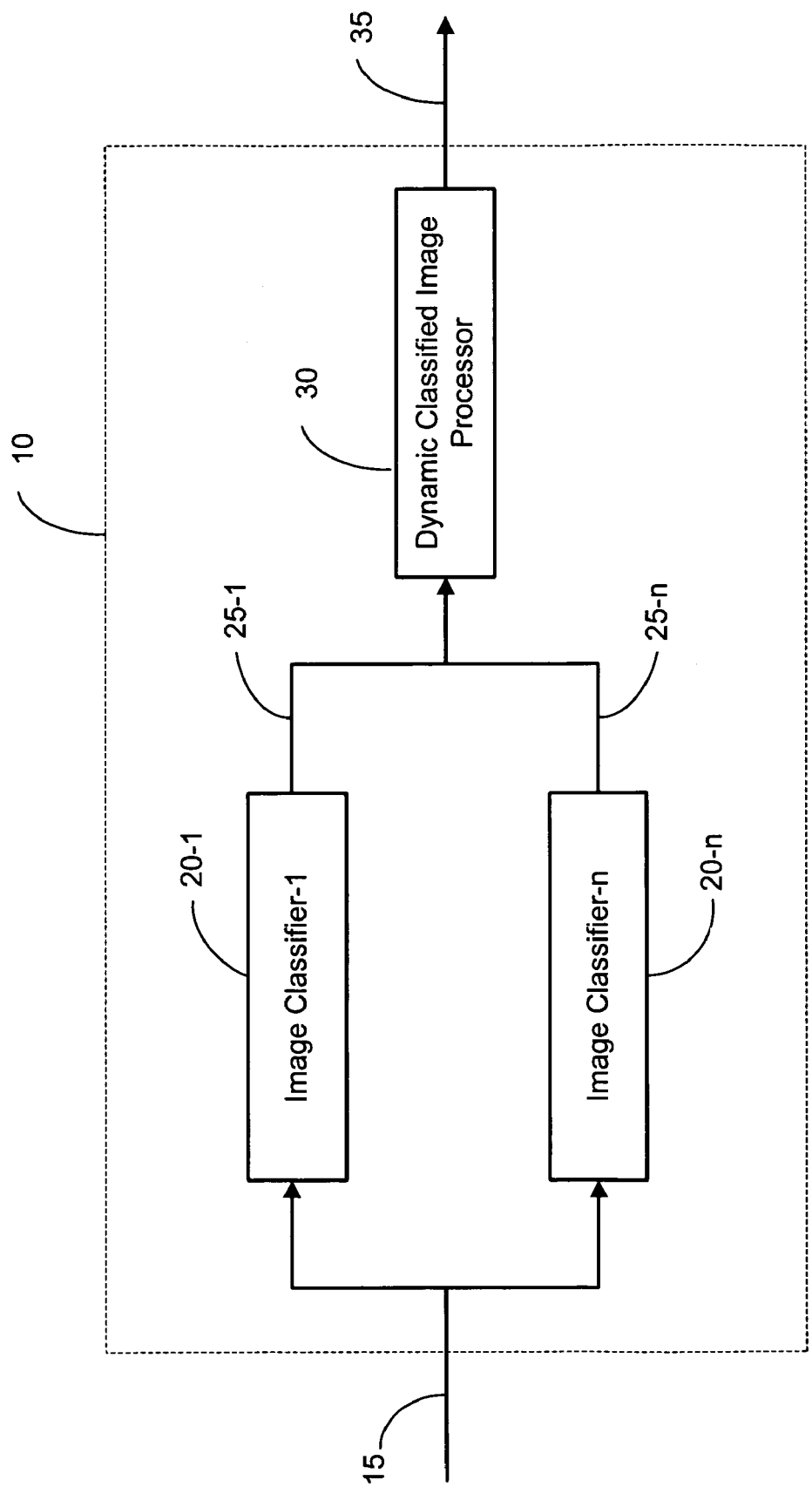
FIG. 1 is a functional block diagram of one exemplary embodiment of a dynamic classification system.

FIG. 1 is a functional block diagram of one exemplary embodiment of a dynamic classification system 10. The system 10 comprises a plurality of different image classifiers 20-1 through 20-n and a dynamic classified image processor 30. For simplicity, only two classifiers 20-1 and 20-n are shown, although any number of classifiers can be used with the systems and methods provided herein. The plurality of classifiers 20-1 to 20-n ("20-1-n") are different in the sense that they use different computational procedures to classify the input image 15. The plurality of classifiers may include a variety of classifiers including Bayesian classifiers, k-nearest neighbor classifiers, neural network classifiers, and the like.

In operation, each of the classifiers 20-1-n receives an input image 15 comprising image data representing pixel values. The input image 15 may originate from an imaging device, computer memory, an image processor, or the like. Each classifier 20-1-n preferably classifies the input image 15 into a classified image 25-1-n, in which regions of the input image 15 are each assigned to a class from a set of classes. Each region may comprise one or more pixels of the input image 15. Preferably, the classifiers 20-1-n classify the input image using the same set of classes. The classified images 25-1-n may be color-coded, in which each class is represented by a different color to distinguish it from other classes. Even though the same input image 15 is inputted to the classifiers 20-1-n, the resulting classified images 25-1-n may be different. This is because each classifier 20-1-n preferably uses a different computational procedure to classify the input image 15. For example, one classifier 20-1 may misclassify a region of the input image 15, while the other classifiers 20-2-n correctly classify the region of the input image 15.

The classified images 25-1-n are inputted to the dynamic classified image processor 30, which sequentially outputs the classified images 25-1-n to a display device (not shown). Preferably, the classified images 25-1-n are sequentially outputted at a rate of 10 to 30 classified images 25-1-n a second, although other rates may also be used. For example, when the classified images 25-1-n are sequentially outputted at a rate of 30 classified images a second, each classified image is displayed for 1/30 of a second on the display device. Preferably, the processor 30 continuously cycles trough the classified images 25-1-n. The sequential display of the classified images 25-1-n produces a dynamic classified image 35 to a human observer, in which the classification of the input image 15 varies with time according to which one of the classified images 25-1-n is displayed at a given instant.

The classifiers 20-1-n and the dynamic classified image processor 30 may be implemented on different processors, the same processor, or a combination thereof. For example, the classifiers 20-1-n may be implemented as a set of programs, where each program defines the computational procedure for one of the classifiers 20-1-n. The classifiers 20-1-n and the dynamic classified image processor 30 may then be implemented on the same processor by having the processor sequentially execute the program for each of the classifiers 20-1-n. In this implementation, the different classifiers 20-1-n are sequentially applied to the input image 15 by the processor.

Figure 2:
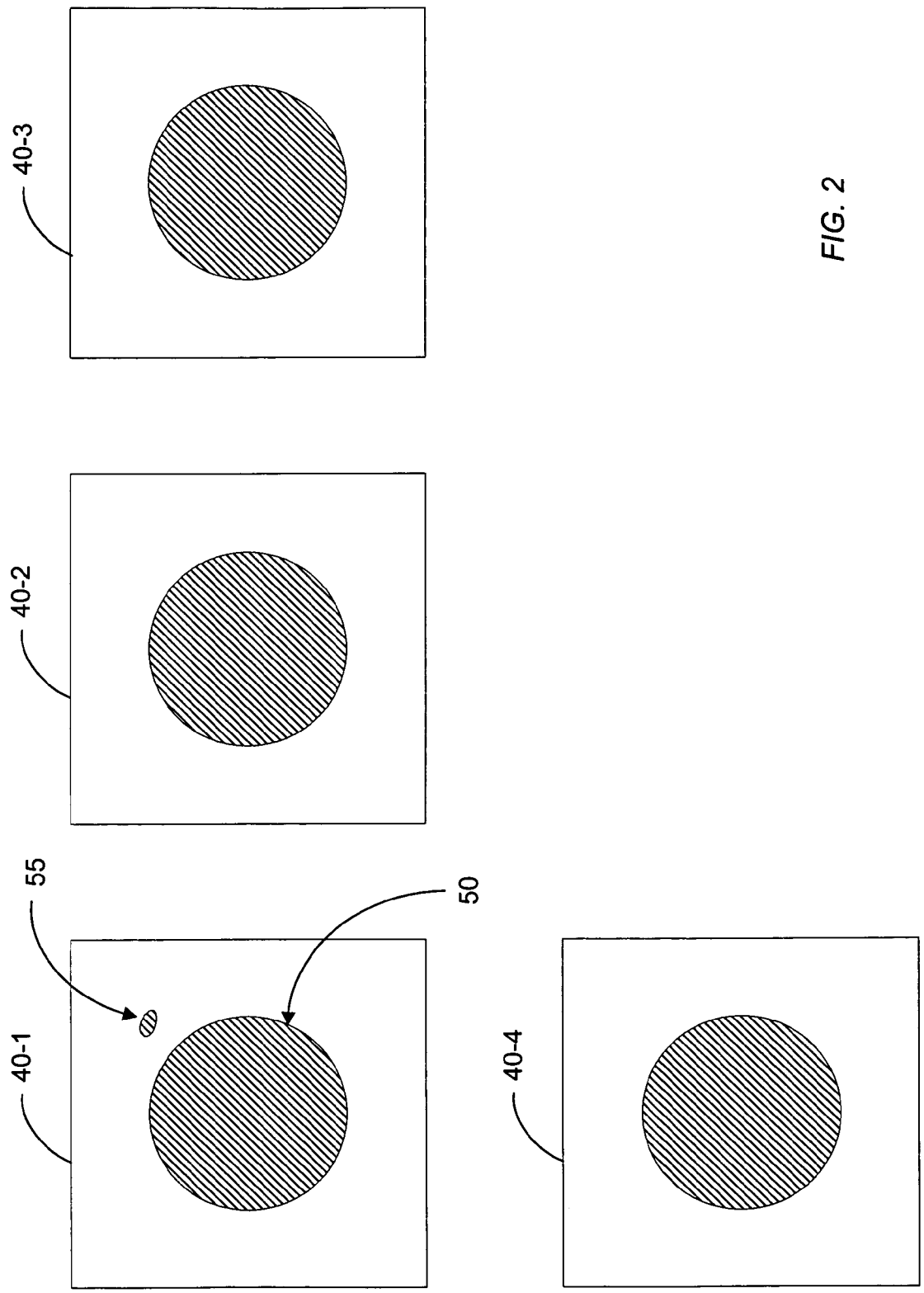
FIG. 2 shows a set of four exemplary classified images.

The dynamic classified image improves classification accuracy by providing dynamic stimuli that encourages the human visual system to excuse occasional classification errors from a minority of the classified images and retain generally correct classifications from a majority of the classified images. This can be illustrated by way of a simple example with reference to FIG. 2, which shows a set of four classified images 40-1 through 40-4. In this example, the classified images 40-1 to 40-4 classify an input image of a blood vessel into one of two classes, blood (shaded) and non-blood (non-shaded). In this example, classified image 40-1 misclassifies a region of tissue as blood, which appears as an isolated blood speck 55 located outside the general area of the blood vessel interior 50, while the other three classified images 40-2 to 40-4 correctly classify the tissue as non-blood.

The four classified images 40-1 to 40-4 are sequentially displayed to a human observer, for example, a physician, producing a dynamic classified image, in which the tissue region is misclassified as a blood speck 55 approximately one-quarter of the time and is correctly classified as non-blood approximately three-quarters of the time. Because the misclassified blood speck 55 appears only one-quarter of the time in the dynamic classified image, the dynamic classified image encourages the physician to excuse the misclassified blood speck 55 from classified image 40-1 and to retain the correct classification from classified images 40-2 to 40-4. In addition, the physician can draw upon his/her own experience to perceive that the blood speck 55 is in error. In this example, the misclassified blood speck 55 appears outside the general area of the blood vessel interior 50, which is contrary to the physician's experience. The three-quarters of the time that the blood speck 55 does not appear in the dynamic classified image reinforces the physician's perception that the blood speck 55 is in error and encourages the physician to retain the correct classification.

Thus, the dynamic classified image provides dynamic stimuli that encourages the human visual system to excuse occasional errors from a minority of the classified images, especially when they occur in unrealistic contexts, and to retain generally correct classification from a majority of the classified images, especially when they occur in expected contexts. The dynamic classification system draws upon the considerable processing power of the human visual system. This allows the system to achieve high accuracy using a set of relatively simple individual classifiers instead of a computationally intensive classifier design, which translates to an advantage in computational speed.

The individual classified images 25-1-n making up the dynamic classified image may be sequentially displayed to the user many different ways. For example, the classified images 20-1-n may be sequentially displayed in a predetermined order or in a random order. In addition, the dynamic processor 30 may randomly display the classified images 20-1-n with no restriction that it cycle though all the classified images before displaying a particular classified image again.

Also, the classifiers 20-1-n are not required to break up the input image 15 into the same image regions. The classifiers 20-1-n may break up the input image 15 into different image regions depending on the computational procedures used by the classifiers 20-1-n.

In another embodiment, the dynamic image system may normally display a single classified image and give the user the option of displaying the dynamic classified image. For instance, this option could be selected if the user suspects that the single classified image is in error.

Figure 3:
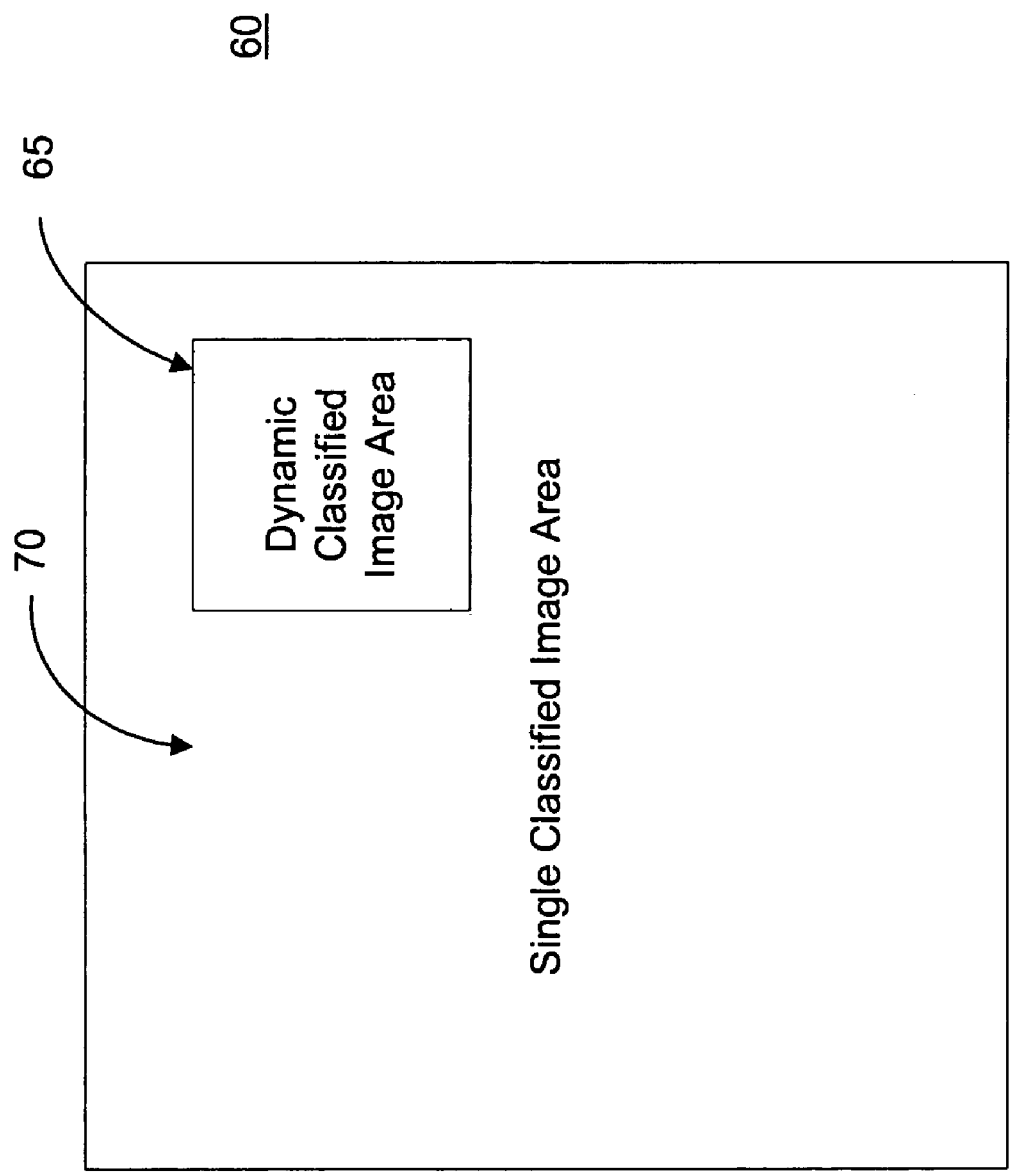
FIG. 3 shows an exemplary output image divided into a dynamic classified image area and a single classified image area.

In yet another embodiment, dynamic classification is only applied to a selected area of the input image, with the remaining area of the input image being classified by a single classifier. FIG. 3 illustrates an exemplary output image 60 divided into a dynamic classified image area 65 and a single classified image area 70. Within the dynamic classified image area 65, dynamic classification is applied to the input image, and within the single classified image area 70, a single classifier is applied to the input image. In this embodiment, the dynamic classification system may give the user the option of specifying the location and/or the dimensions of the dynamic classified image area 65 within the output image 60. In addition, the dynamic classified system may include multiple dynamic classified image areas using the same set of classifiers or different sets of classifiers.

The systems and methods described herein can be used with any form of medical imaging to which an image classifier 20-1-n can be applied. An example of just one of these many different forms of imaging is an intravascular ultrasound imaging system (IVUS). In one exemplary embodiment using an IVUS, ultrasound images of the interior of a body lumen, such as a blood vessel, are taken with an ultrasound imaging device located within the vessel and then displayed using the dynamic classification system 10.

In the foregoing specification, the invention has been described with reference to specific embodiments thereof. It will, however, be evident that various modifications and changes may be made thereto without departing from the broader spirit and scope of the invention. For example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. A method for generating a dynamic classified image, comprising:
   applying a plurality of different classifiers to an input image, wherein each of the plurality of classifiers produces a classified image based on the input image; and
   sequentially displaying the classified images from the plurality of classifiers.

2. The method of claim 1, wherein the plurality of classifiers classify the input image using the same set of classes.

3. The method of claim 1, wherein the classified images are color-coded.

4. The method of claim 1, further comprising selecting the classifiers from a group consisting of Bayesian classifiers, k-nearest neighbor classifiers, and neural network classifiers.

5. The method of claim 1, wherein supplying step sequentially supplies the plurality of classifiers to the input image.

6. The method of claim 1, wherein the displaying step sequentially displays the classified images in a predetermined order.

7. The method of claim 1, wherein the displaying step sequentially displays the classified images in a random order.

8. The method of claim 1, wherein dynamic classification is applied to only a user-defined portion of the input image.

9. A method for generating a dynamic classified image, comprising:
   applying a plurality of different classifiers to an input image, wherein each of the plurality of classifiers produces a classified image based on the input image; and
   sequentially displaying the classified images from the plurality of classifiers, wherein the displaying step sequentially displays the classified images at a rate of between 10 to 30 classified images a second.

10. A system for generating a dynamic classified image, comprising:
- a plurality of different classifiers configured to process the same input image, wherein each of the plurality of classifiers produces a classified image based on the input image; and
- a dynamic classified image processor coupled to the plurality of classifiers, wherein the dynamic classified image processor sequentially outputs the classified images from the plurality of classifiers.

11. The system of claim 10, wherein the plurality of classifiers classify the input image using the same set of classes.

12. The system of claim 10, wherein the classified images are color-coded.

13. The system of claim 10, wherein the classifiers are selectable from a group consisting of Bayesian classifiers, k-nearest neighbor classifiers, and neural network classifiers.

14. The system of claim 10, wherein the dynamic classified image processor sequentially displays the classified images in a predetermined order.

15. The system of claim 10, wherein the dynamic classified image processor sequentially displays the classified images in a random order.

16. The system of claim 10, wherein dynamic classification is applied to only a user-defined portion of the input image.

17. A system for generating a dynamic classified image, comprising:
- a plurality of different classifiers configured to process the same input image, wherein each of the plurality of classifiers produces a classified image based on the input image; and
- a dynamic classified image processor coupled to the plurality of classifiers, wherein the dynamic classified image processor sequentially outputs the classified images from the plurality of classifiers, wherein the dynamic classified image processor is adapted to sequentially display the classified images at a rate of between 10 to 30 classified images a second.

* * * * *